April 11, 1961    M. VON RADICS    2,979,020
TRANSMISSION DRIVEN BACKUP ALARM
Filed April 18, 1958
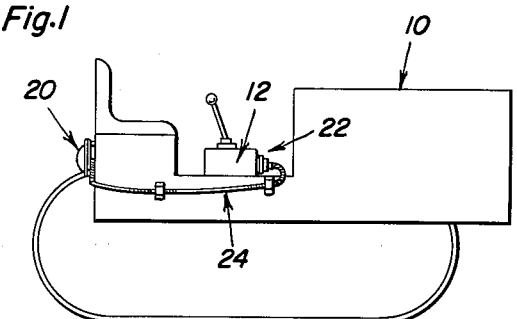
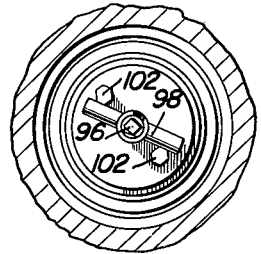
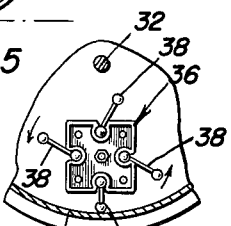
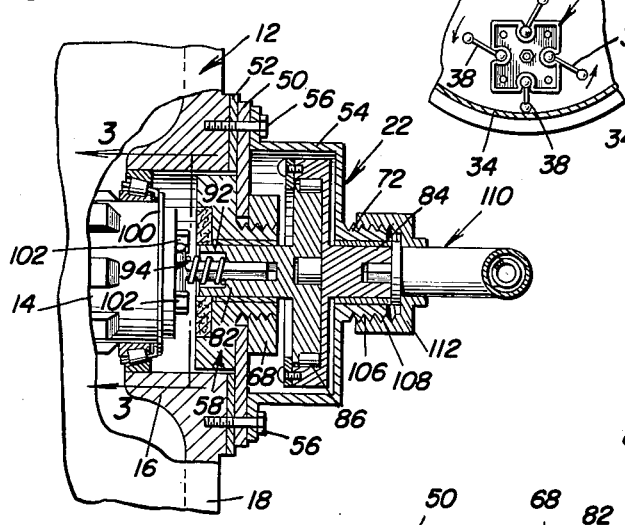
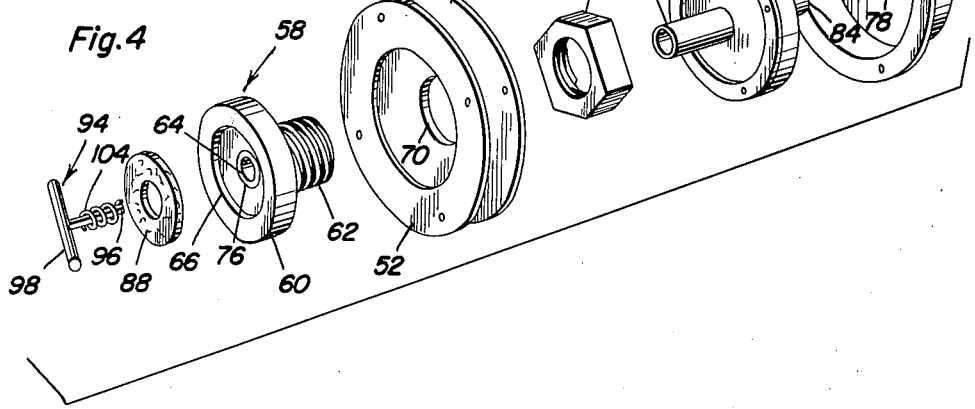

United States Patent Office 2,979,020
Patented Apr. 11, 1961

2,979,020

TRANSMISSION DRIVEN BACKUP ALARM

Max von Radics, Box 2266, Anchorage, Alaska

Filed Apr. 18, 1958, Ser. No. 729,284

6 Claims. (Cl. 116—57)

This invention relates in general to new and useful improvements in alarm devices, and more specifically to an alarm device for indicating the fact that a tractor is backing up.

The operator of a tractor is so mounted on the tractor whereby he looks forward as he drives the tractor. While the operator of the tractor also tends to look rearwardly as he backs up, due to the fact that the controls for the tractor are mounted in front of him, he cannot give the amount of attention to the rear of the tractor which he can to the front. There are many instances where workmen in the area of the tractor are run over by the tractor when it is backing up. For that reason, it is the primary object of this invention to provide a backup alarm for a tractor, the backup alarm being so constructed whereby it automatically operates as soon as the tractor starts to back up.

Another object of this invention is to provide an improved backup alarm for tractors, the backup alarm being so constructed whereby it is mechanically driven from the transmission of the tractor so that the operation thereof is positive upon the operation of the tractor in reverse.

Another object of this invention is to provide an improved backup alarm device for tractors, the backup alarm device being so constructed whereby it may be readily connected to the transmission of a tractor, the connection being made with the countershaft of the transmission, which countershaft has one end thereof exposed and to which a drive shaft may be readily connected.

A further object of this invention is to provide a backup alarm for tractors, the backup alarm including an adapter head which may be conveniently mounted on a tractor transmission and coupled to the countershaft thereof without requiring any alteration whatsoever to the transmission, the adapter head having connected thereto a drive shaft the adapter head being so constructed whereby it drives the alarm device only when the tractor is backing up so that an alarm is automatically sounded upon the backing up of the tractor.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of a tractor showing mounted on the tractor the alarm device which is the subject of this invention, the tractor being shown schematically;

Figure 2 is an enlarged fragmentary sectional view of the forward part of the tractor transmission and shows coupled to the countershaft thereof the adapter head which forms a part of the backup alarm;

Figure 3 is an enlarged fragmentary sectional view taken substantially upon the plane indicated by the section line 3—3 of Figure 2 and shows the manner in which a drive key of the adapter head is coupled to the countershaft;

Figure 4 is an enlarged exploded perspective view of the adapter head;

Figure 5 is a fragmentary sectional view taken through the alarm device; and

Figure 6 is an enlarged fragmentary vertical sectional view taken through the alarm device and shows further details thereof.

Referring now to the drawings in detail, it will be seen that there is illustrated in Figure 1 a conventional tractor which is referred to in general by the reference numeral 10. The tractor 10 may be of any type, but must include a transmission 12 having a countershaft 14 which has a forward end thereof accessible through an opening 16 of a housing 18 in the transmission.

Mounted on the rear part of the tractor 10 is an alarm device which is referred to in general by the reference numeral 20 and which will be described in more detail hereinafter. Mounted on the transmission 12 and coupled to the countershaft 14 is an adapter head which is referred to in general by the reference numeral 22. The adapter head 22 is connected to the alarm device 20 by means of a drive shaft which is referred to in general by reference numeral 24.

Referring now to Figures 5 and 6 in particular, it will be seen that the alarm device 20 includes a mounting plate 26 which is secured to the rear part of the tractor 10 by means of mounting bolts 28. The mounting plate 26 is spaced from the rear part of the tractor 10 by means of spacers 30 carried by the mounting bolts 28.

Extending rearwardly from the mounting plate 26 is an elongated spacing bolt 32 which supports a bell-like member 34. Mounted within the bell-like member 34 is a striker head 36 which includes a plurality of individual centrifugally actuated strikers 38 which are engageable with the bell-like member 34 to sound an alarm.

The mounting plate 26 includes a sleeve 40 in which there is journaled a shaft 42. The striker 36 is carried by the shaft 42 for rotation. Secured to the mounting plate 26 is an angle head 44 to which is coupled both the drive shaft 24 and the drive shaft 42. The drive shaft 24 includes a flexible housing 46 and a cable-type drive shaft 48.

The opening 16 in the transmission housing 18 is normally closed by means of the cover plate which has been replaced by a plate 50 which is a part of the adapter head 22. The plate 50 is sealed to the transmission housing 18 by means of a gasket 52. The plate 50, a cap 54 and the gasket 52 are held in place by means of bolts 56 which replace the original cover plate retaining bolts (not shown).

Carried by the plate 50 is a bearing support which is referred to in general by the reference numeral 58. The bearing support 58 includes a circular body portion 60 and a reduced externally threaded portion 62. Extending through the bearing support 58 is a bore 64. The bore 64 is disposed concentric of a circular recess 66 formed in the rear part of the body portion 60. The bearing support 58 is supported from the plate 50 by means of a nut 68 which is threadedly engaged on the portion 62 and which serves to clamp the bearing support 58 to the plate 50, the portion 62 extending through a bore 70 in the plate 50.

The cover 54 is provided with an externally threaded boss 72 which projects away from the transmission 12. The boss 72 is aligned with the portion 62 and has extending therethrough a bore 74.

Disposed within the bore 64 is a bushing 76. A similar bushing 78 is positioned within the bore 74.

Rotatably journaled in the bushings 76 and 78 is a drive unit which is referred to in general by the reference numeral 80 and which includes a pair of shaft portions 82 and 84 which are connected together by an overrunning clutch 86. The shaft portion 82 is journaled in the bushing 76 and the shaft portion 84 is journaled in the bushing 78.

It is to be noted that there is positioned within the recess 66 a seal 88 which engage the forward end of the shaft portion 82 so as to prevent the escape of lubricating fluids from the transmission 12 through the bearing support 58.

The shaft portion 82 has extending therethrough a non-circular opening 90 which is preferably square in cross-section. The opening 90 terminates at the forward end thereof in an enlarged bore 92.

In order that the shaft portion 82 may be connected to the countershaft 14, there is provided a T-shaped drive key which is referred to in general by the reference numeral 94. The T-shaped drive key 94 includes a stem 96 which is of a cross-section corresponding to the cross-section of the opening 90 so as to be interlocked with the shaft portion 82. Formed integrally with the stem 96 is a crossbar 98.

The exposed end of the countershaft 14 is provided with a retaining washer 100 which is secured in place by means of a pair of bolts 102. The drive is obtained from the countershaft 14 by placing the crossbar 98 of the key 94 between the heads of the bolts 102 in the manner best shown in Figure 3. In order that the crossbar 98 may be retained in engagement with the heads of the bolts 102, there is mounted on the stem 96 a coil spring 104 which is partially seated in the bore 92 and which engages against both the shaft portion 82 and the crossbar 98, as is best shown in Figure 2.

The shaft portion 84 has formed therein a longitudinally extending opening 106 which is non-circular in cross-section and which is preferably square in cross-section like the opening 90. Disposed in the opening 106 is a drive shaft 108 of an angle head which is referred to in general by the reference numeral 110. The angle head 110 includes a nut portion 112 which is threadedly engaged on the portion 72 of the cap 54 so as to mount the angle head 110. The drive shaft 24 is connected to the other end of the angle head 110.

It is to be understood that when the tractor 10 is moving, the countershaft 14 rotates with the direction of rotation of the countershaft 14 depending upon the direction of movement of the tractor 10. By providing the overrunning clutch 80, the shaft portion 84 is rotated only when the tractor 10 is backing up although the shaft portion 82 rotates always when the tractor is moving. Thus the backup alarm device 20 is actuated only when the tractor 10 is actually backing up. By sounding such an alarm, workmen around the tractor 10 are immediately notified of the rearward movement of the tractor 10 in order that they may stand clear thereof.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

1. A backup alarm driving means for mounting in an opening in the transmission housing adjacent the end of a countershaft therein, comprising a casing, fastening means fixedly securing the casing to the housing over the opening therein, a pair of aligned inner and outer bearings mounted on the casing and in alignment with the countershaft end, an overrunning clutch having oppositely extending supporting shafts journaled respectively in the aligned bearings, one of said shafts being adjacent to the countershaft end, interengaging members respectively fixed for rotation with said countershaft end and said adjacent clutch shaft end, a flexible rotatable shaft for operating the alarm, and means for fixing the driven end of the flexible shaft nonrotatably to the other aligned clutch shaft.

2. A backup alarm driving means in accordance with claim 1 in which the interengaging members are resiliently held in engagement by a spring seated in the end of the adjacent clutch shaft.

3. A backup alarm driving means in accordance with claim 1 in which one of the interengaging members is slidably mounted in the end of said adjacent clutch shaft, and a coil spring resiliently pressing said one member into interengagement with the other member.

4. A backup alarm in accordance with claim 1 in which there is a bell, and means for ringing the bell connected for rotation with the driving end of the flexible rotatable shaft.

5. The combination with a countershaft rotatably journaled within a housing having an opening therein opposite the end of the countershaft, comprising a second housing fixedly secured to the first housing over the opening therein, a second shaft journaled in the second housing, coupling means connecting the countershaft and second shaft for rotation together, a remote mechanism, and means including an overrunning clutch journaled in the second housing for operatively connecting the second shaft to said mechanism.

6. Mechanism for taking power from a countershaft rotatable within a housing having an opening opposite the end of said shaft, comprising a second housing fixedly secured to the first housing over the opening therein, journal bearings arranged in the second housing, an overrunning clutch having inwardly and outwardly extending shafts journaled in said bearings, interengaging members respectively fixed for rotation with said countershaft end and the inwardly extending clutch shaft, and means on the free end of the outwardly extending shaft for coupling another shaft.

References Cited in the file of this patent

UNITED STATES PATENTS

| | | |
|---|---|---|
| 1,281,595 | Lehmann | Oct. 15, 1918 |
| 1,327,993 | Goldblatt | Jan. 13, 1920 |
| 1,487,445 | Dickinson | Mar. 18, 1924 |
| 2,552,682 | Lopez | May 15, 1951 |
| 2,662,412 | Miller | Dec. 15, 1953 |
| 2,664,183 | Payne | Dec. 29, 1953 |

FOREIGN PATENTS

| | | |
|---|---|---|
| 24,425 | Great Britain | of 1906 |
| 454,211 | Great Britain | Sept. 25, 1936 |